US007059864B2

United States Patent
Matthies et al.

(10) Patent No.: US 7,059,864 B2
(45) Date of Patent: Jun. 13, 2006

(54) DISTRIBUTION DEVICE OF A TELECOMMUNICATIONS SYSTEM

(75) Inventors: Jürgen Matthies, Witten (DE); Mike Breuer-Heckel, Dortmund (DE); Stefan Badura, Menden (DE)

(73) Assignee: CCS Technology, Inc., Wilmington, DE (US)

( * ) Notice: Subject to any disclaimer, the term of this patent is extended or adjusted under 35 U.S.C. 154(b) by 0 days.

(21) Appl. No.: 10/522,432

(22) PCT Filed: Jun. 30, 2003

(86) PCT No.: PCT/EP03/06937

§ 371 (c)(1),
(2), (4) Date: Jan. 17, 2005

(87) PCT Pub. No.: WO2004/008589

PCT Pub. Date: Jan. 22, 2004

(65) Prior Publication Data
US 2006/0009062 A1   Jan. 12, 2006

(30) Foreign Application Priority Data
Jul. 17, 2002  (DE)  ............................. 102 32 444.1

(51) Int. Cl.
H01R 12/00  (2006.01)

(52) U.S. Cl. ....................................................... 439/62
(58) Field of Classification Search ................. 439/62, 439/260, 637, 188, 83, 61, 67
See application file for complete search history.

(56) References Cited

U.S. PATENT DOCUMENTS

| 6,186,808 B1 | 2/2001 | Snow et al. ................. 439/225 |
| 6,751,859 B1 * | 6/2004 | Farnworth et al. ............ 29/842 |
| 6,918,778 B1 * | 7/2005 | Ruckerbauer et al. ...... 439/260 |

FOREIGN PATENT DOCUMENTS

| DE | 19842447 | 4/2000 |
| EP | 0777298 | 6/1997 |

* cited by examiner

*Primary Examiner*—J. F. Duverne

(57) ABSTRACT

The invention relates to a distribution device of a telecommunications system. Distribution devices of this type have at least one contact element, the or each contact element having at least two contact springs. According to the invention, the or each contact element has a modular structure in such a way that the configuration of the or each contact element can be modified by modifying the modular structure.

6 Claims, 5 Drawing Sheets

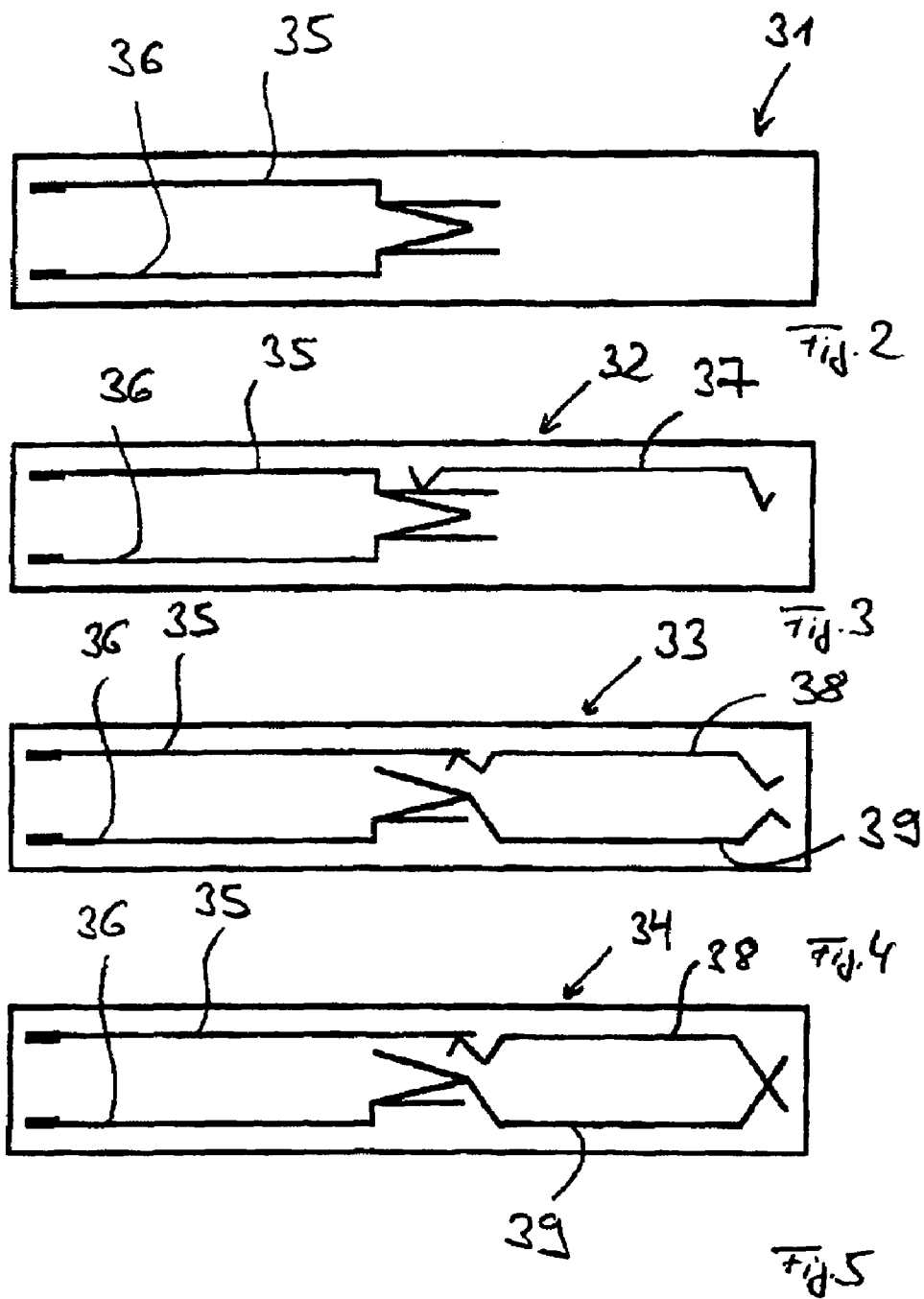
PRIOR ART

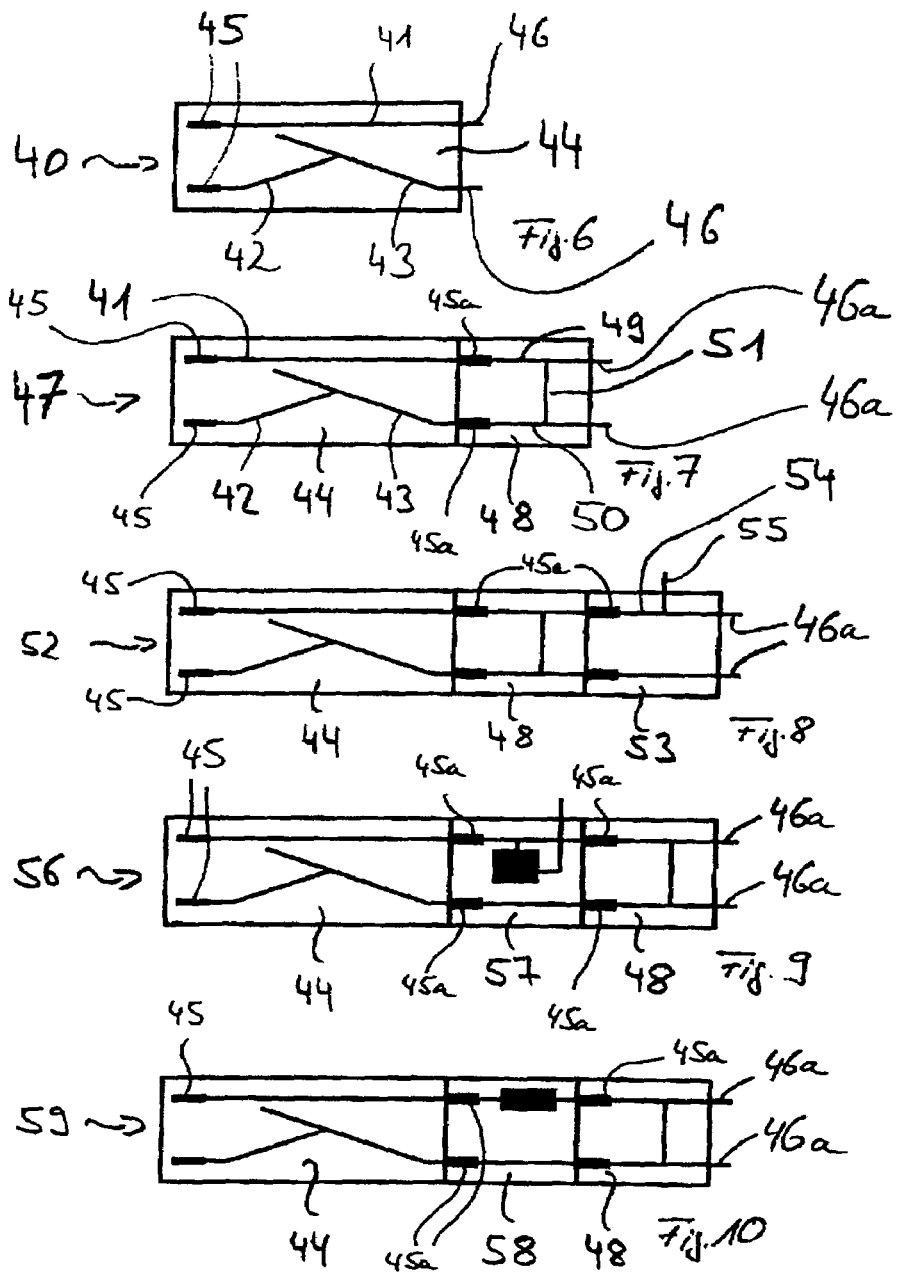

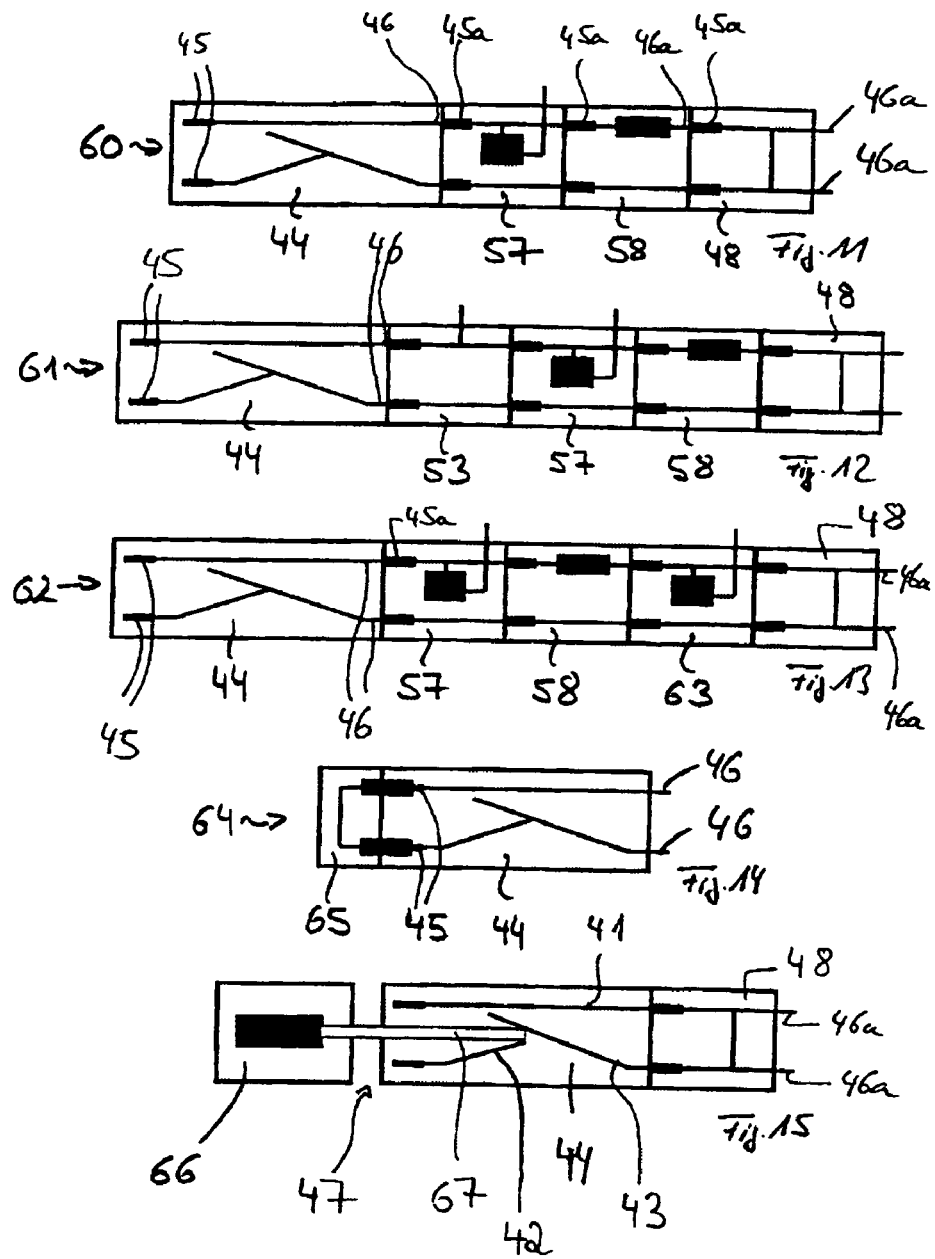

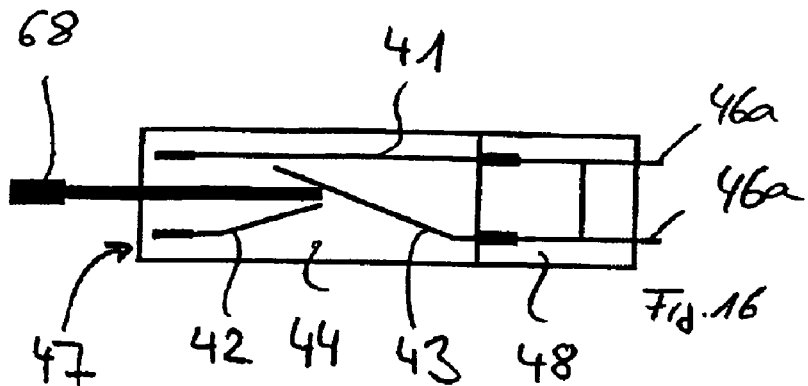
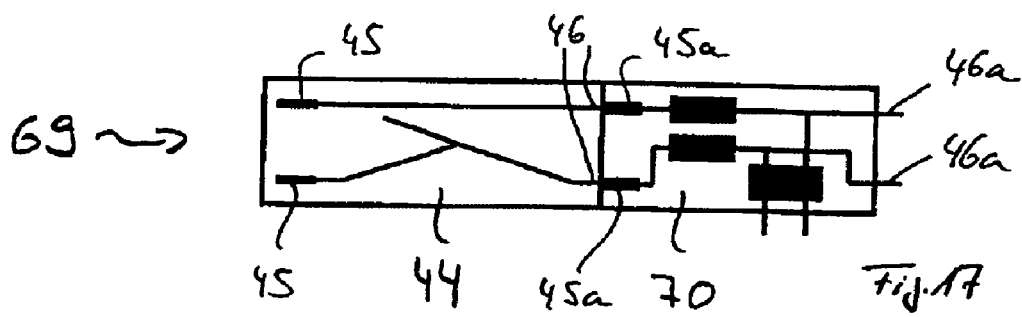
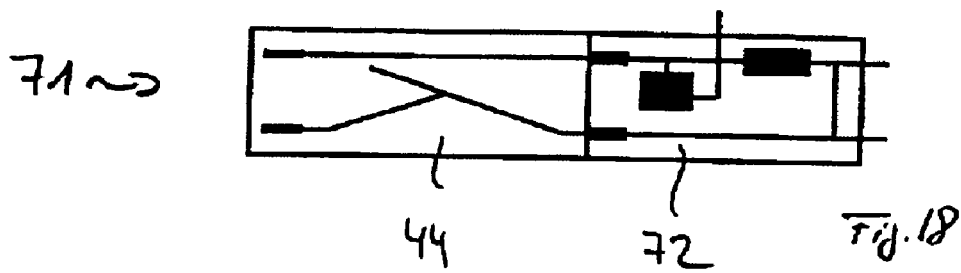
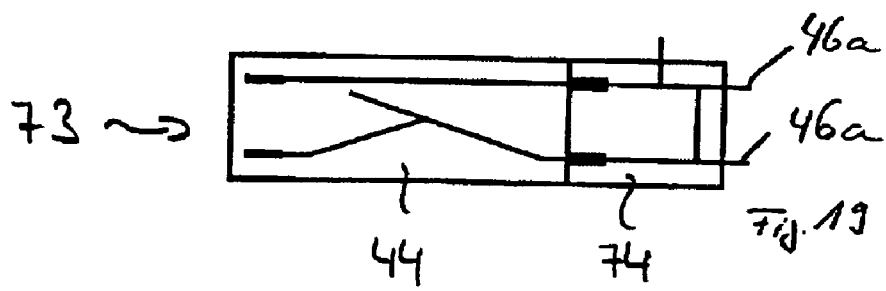

DISTRIBUTION DEVICE OF A TELECOMMUNICATIONS SYSTEM

This National stage application claims the benefit of International Application No. PCT/EP03/06937, filed on Jun. 30, 2003, which claims the benefit of German Patent Application No. 10232444.1, filed on Jul. 17, 2002, and which was not published in the English language under PCT Article 21(2).

FIELD OF THE INVENTION

The invention relates to a distribution device of a telecommunications system.

BACKGROUND OF THE INVENTION

Distribution devices of a telecommunications system are sufficiently known from the prior art. For example, DE 199 12 522 C2 shows a distribution device of a telecommunications system. The distribution device disclosed there is a so-called distribution block, in which a number of distribution strips are arranged one above the other in a sandwich-like manner. Each distribution strip, also known as a contact strip, comprises a number of distribution elements, also known as contact elements. According to the prior art, when considering the contact elements, a distinction is made between so-called disconnection elements and so-called switching elements, depending on whether contact springs of the contact elements lie against one another or are disconnected from one another.

When the term distribution devices is used below, it is intended for the purposes of the invention that this can mean both a distribution block and a distribution strip. It is also possible for the purposes of the invention for a number of distribution blocks to be interconnected and form a distribution device.

According to the prior art, distribution strips with differently configured contact elements are used for constructing distribution blocks. According to the prior art, the contact elements cannot be modified with respect to their configuration. Therefore, according to the prior art, for special applications it is necessary to provide different distribution strips. Furthermore, the flexibility of such distribution strips and distribution blocks made up of them is low.

Against this background, the present invention is based on the problem of providing a novel distribution device of a telecommunications system.

BRIEF DESCRIPTION OF THE DRAWINGS

Preferred developments of the invention are provided by the detailed description which follows. Exemplary embodiments are explained in more detail on the basis of the drawings, in which:

FIG. 2 shows a contact element according to the prior art for the distribution device of FIG. 1 in a schematized representation, FIG. 3 shows a further contact element according to the prior art for the distribution device of FIG. 1 in a schematized representation, FIG. 4 shows a further contact element according to the prior art for the distribution device of FIG. 1 in a schematized representation, FIG. 5 shows a further contact element according to the prior art for the distribution device of FIG. 1 in a schematized representation, FIG. 6 shows a first contact element for a distribution device of a telecommunications system as provided by the invention, FIG. 7 shows a second contact element for a distribution device of a telecommunications system as provided by the invention, FIG. 8 shows a third contact element for a distribution device of a telecommunications system as provided by the invention, FIG. 9 shows a fourth contact element for a distribution device of a telecommunications system as provided by the invention, FIG. 10 shows a fifth contact element for a distribution device of a telecommunications system as provided by the invention, FIG. 11 shows a sixth contact element for a distribution device of a telecommunications system as provided by the invention, FIG. 12 shows a seventh contact element for a distribution device of a telecommunications system as provided by the invention, FIG. 13 shows an eighth contact element for a distribution device of a telecommunications system as provided by the invention, FIG. 14 shows a ninth contact element for a distribution device of a telecommunications system as provided by the invention, FIG. 15 shows a further contact element for a distribution device of a telecommunications system as provided by the invention, FIG. 16 shows a further contact element for a distribution device of a telecommunications system as provided by the invention, FIG. 17 shows a further contact element for a distribution device of a telecommunications system as provided by the invention, FIG. 18 shows a further contact element for a distribution device of a telecommunications system as provided by the invention, and FIG. 19 shows a further contact element for a distribution device of a telecommunications system as provided by the invention.

DETAILED DESCRIPTION OF THE INVENTION

Figure 1:
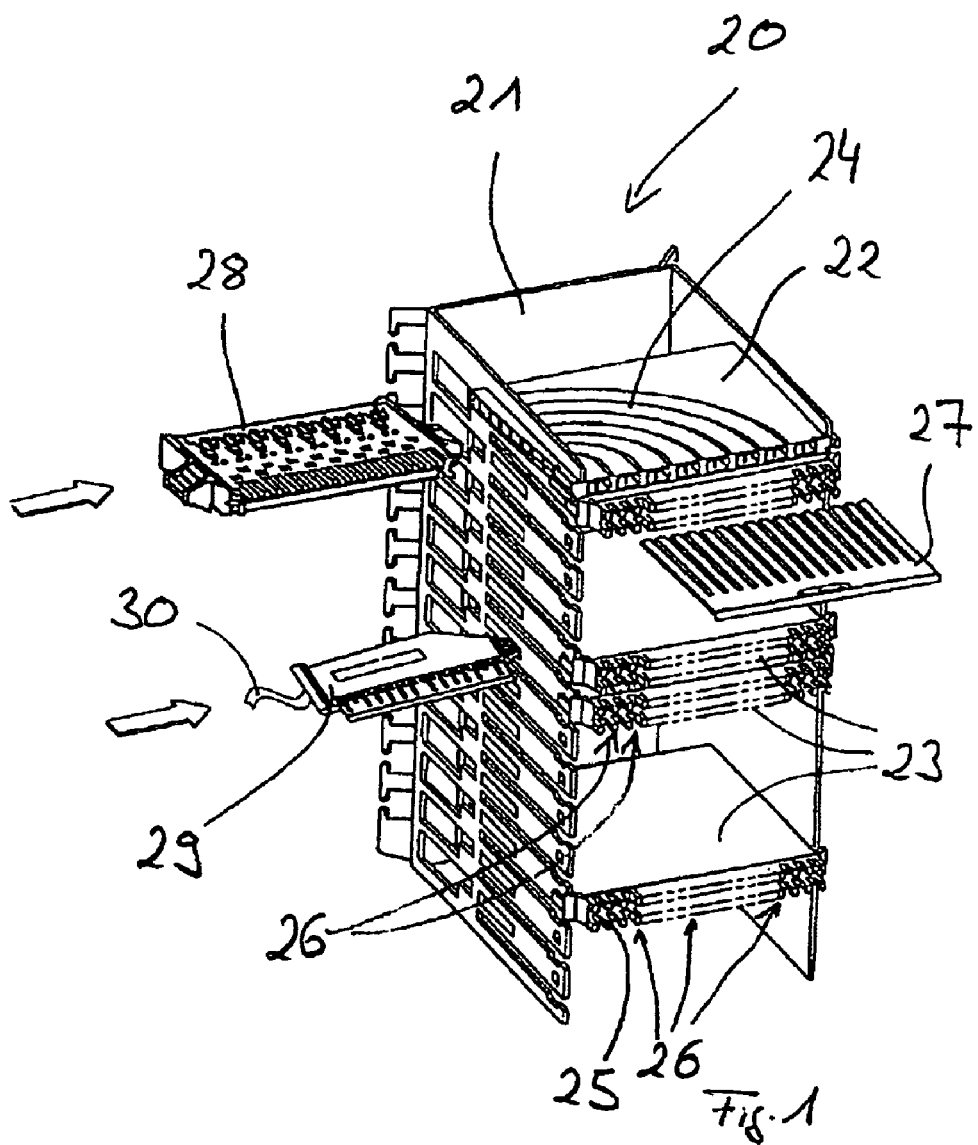
FIG. 1 shows a distribution device of a telecommunications system according to the prior art in a perspective side view.

FIG. 1 shows a distribution block 20 according to the prior art. The distribution block 20 shown there has a carrier part 21, with plate-like wire guides 22 and distribution strips 23, which are also referred to as contact strips, being arranged in the carrier part 21 one above the other in a sandwich-like manner. The carrier part 21 is also referred to as a receiving trough. The wire guides 22 have arcuately curved wire guiding channels 24, in which incoming and outgoing lines can be guided. The distribution strips 23 are provided on one side with insulation piercing connecting devices 25, in the clamping slots of which the incoming and outgoing lines can be pressed in with the aid of a tool to make contact. Each distribution strip 23 is formed by a number of contact elements 26, the insulation piercing connecting devices 25 acting on the contact elements 26. In the interior, the contact elements 26 bear contact springs. Depending on whether the contact springs of the contact elements 26 lie against one another or are disconnected from one another, the contact elements are referred to as disconnection elements or switching elements. In particular whenever the distribution block 20 is formed by distribution strips 23 with their contact elements 26 formed as disconnection elements, a disconnector 27 can be pushed in from the front side of the distribution block 20 to allow the disconnection elements to be interrupted if need be. FIG. 1 also shows a protection magazine 28, which can be pushed into the carrier part 21 from the side. It can also be pushed into the carrier part from the rear. According to the prior art, each distribution strip 23 is preferably assigned a protection magazine 28, in order to protect the contact elements 26 of the distribution strip 23 from overcurrent and/or overvoltage. Similarly, FIG. 1 shows a cable connector 29, which can likewise be pushed into the carrier part 21 of the distribution block 20 from the side. If need be, a cable connector 29 of this type, on which a prefabricated cable 30 acts, can be assigned to each of the distribution strips 23 in order to connect the contact elements 26 of the corresponding distribution strip 23 for example to a distribution strip of another distribution block.

As already mentioned, the distribution strips 23 according to the prior art are made up of preferably eight or ten contact elements 26. However, distribution strips 23 formed by four or five contact elements 26 may also be used. According to the prior art, the contact elements 26 are preconfigured components which cannot be modified with regard to their configuration.

FIGS. 2 to 5 show a total of four contact elements 31, 32, 33 and 34 according to the prior art. The contact element 31 according to FIG. 2 has two contact springs 35 and 36, which touch each other. The contact element 31 accordingly comprises a disconnection element. The contact element 32 of FIG. 3 also comprises a disconnection element, the contact springs 35, 36 of which touch each other. As a difference from FIG. 2, however, in the case of the contact element 32 of FIG. 3 the contact spring 35 is assigned a so-called 3-point protective contact, in order that, if need be, a protective element of the protection magazine 28 acting as an overvoltage protection can be connected to the contact element 32.

FIG. 4 shows a contact element 33, the contact springs 35 and 36 of which do not touch each other. The contact element 33 represented there comprises a switching element. The contact springs 35 and 36 of the contact element 33 are assigned so-called 5-point protective contacts 38 and 39. The contact element 33 of FIG. 4 comprises open 5-point protective contacts 38, 39, which do not touch each other and form a so-called forced protection. In the case of the exemplary embodiment of FIG. 5, on the other hand, the 5-point protective contacts 38, 39 of the contact element 34 touch one another. The contact element 34 of FIG. 5 therefore comprises a disconnection element. If need be, a 5-point protective element of the protection magazine 28 acting as overvoltage protection and overcurrent protection can be connected to the respective contact element by means of the 5-point protective contacts 38 and 39.

The contact elements 31, 32, 33 and 34 according to the prior art that are represented in FIGS. 2 to 5 comprise preconfigured contact elements. This means that these contact elements are formed either as switching elements or as disconnection elements. Furthermore, they are preconfigured either with a 3-point protective contact or with 5-point protective contacts. To cater for the respective application, it is therefore necessary to keep different distribution strips available, made up of contact elements of this type. Furthermore, distribution strips formed from contact elements of this type cannot be flexibly reconfigured.

To obviate the above disadvantages of the prior art, the invention proposes a distribution device for a telecommunications system with contact elements of a modular structure. The configuration of the respective contact element can be modified by modifying the modular structure of the contact elements. This is represented in FIGS. 6 to 19.

For instance, FIG. 6 shows a contact element 40 which comprises three contact springs 41, 42, 43. The two lower contact springs 42, 43 of the contact element 40 form a functional unit and lie against one another.

However, the two contact springs 42, 43 do not touch the upper contact spring 41. The contact element 40 according to FIG. 6 accordingly forms a so-called switching element. The contact element 40 of FIG. 6 also forms a basic element 44 for the purposes of the invention. It has inputs 45, to connect incoming or outgoing lines, and also outputs 46, to allow further modules, so-called supplementary modules, to be connected to the basic module 44.

In the case of the contact element 47 represented in FIG. 7, a supplementary module 48 is connected to the basic module 44. The supplementary module 48 comprises a short-circuit module. Therefore, a first conductor element 49 of the supplementary module 48 acts on the contact spring 41 and a second conductor element 50 of the supplementary module 48 acts on the contact spring 43. The two conductor elements 49, 50 are short-circuited by means of a conductor element 51. With the aid of the supplementary module 48, the basic module 44 formed or configured as a switching element can accordingly be reconfigured into a disconnection element.

As FIG. 7 further reveals, the supplementary module 48 also has inputs 45a and outputs 46a. The supplementary module 48 can be connected via the inputs 45a to the outputs 46 of the basic module 44. Further supplementary modules can be connected to the supplementary module 48 via its outputs 46a.

FIG. 8 shows a contact element 52, comprising the basic module 44 with the first supplementary module 48 added on and comprising a second supplementary module 53. The second supplementary module 53 is connected by its inputs 45a to the outputs 46a of the first supplementary module 48. The supplementary module 53 is formed as a cable module. With the aid of the second supplementary module 53 formed as a cable module, the disconnection element formed by the basic module 44 and the first supplementary module 48 can be connected to another contact element (not represented). For this purpose, a cable 55 or a terminal is connected to a conductor element 54 of the supplementary module 53. It is accordingly possible with the aid of the invention not only to reconfigure the contact element 40 formed as a switching element into a contact element 47 formed as a disconnection element but rather it is also possible as a result of the modular structure according to the invention to integrate into a contact element 52 the function of the cable connector 29, which according to the prior art is formed as a separate subassembly. This also significantly increases the flexibility of the distribution device according to the invention and at the same time reduces the installation time for the installation engineer.

The conductor elements 49, 50, 51 and 54 of the supplementary modules may be formed as conductor tracks, electrical conductors in the form of wires or metal sheets or else as contact springs. The actual configuration of the conductor elements 49, 50, 51 and 54 is at the discretion of the person skilled in the art.

FIG. 9 shows a contact element 56, in the case of which a third supplementary module 57 is arranged between the basic module 44 and the first supplementary module 48. The third supplementary module 57 is connected via its inputs 45a to the outputs 46 of the basic module 44 and via its outputs 46a to the inputs 45a of the first supplementary module 48. The third supplementary module 57 is formed as a so-called overvoltage protection module. It accordingly protects the disconnection element formed by means of the basic module 44 and the first supplementary module 48 from overvoltages acting on it. In this way, a 3-point protection can be integrated into the contact element 56. According to the prior art, a separately formed protection magazine was required for this.

In the same way, a 2-point protection can be integrated into a disconnection element formed by the basic module 44 and the first supplementary module 48. For this purpose, a supplementary module 58 configured as an overcurrent protection module is arranged between the basic module 44 and the first supplementary module 48. In this way, a contact element 59 as represented in FIG. 10 is created.

FIG. 11 shows a contact element 60, in the case of which both the supplementary module 57, formed as an overvoltage protection module, and the supplementary module 58, formed as an overcurrent protection module, are connected between the basic module 44 and the first supplementary module 48. The contact element 60 of FIG. 11 accordingly comprises a disconnection element in which there is integrated a combined overvoltage protection and overcurrent protection, and consequently a so-called 5-point protection.

In the case of the contact element 61 of FIG. 12, a total of three further supplementary modules are positioned between the basic module 44 and the first supplementary module 48, which together form a disconnection element. The further supplementary modules concerned here are the supplementary module 58, formed as an overcurrent protection module, the supplementary module 57, formed as an overvoltage protection module, and the supplementary module 53, formed as a cable module. In this way, the basic module 44 can accordingly be reconfigured in such a way that the basic module 44 formed as a switching element can be turned into a disconnection element formed as a disconnection element with integrated 5-point protection and also an integrated cable connector.

FIG. 13 shows a contact element 62, which is constructed in principle in the same way as the contact element 60 of FIG. 11. In addition to the supplementary module 57, formed as an overvoltage protection module, and the supplementary module 58, formed as an overcurrent protection module, there is, however, a further supplementary module 63 arranged between the basic module 44 and the first supplementary module 48. The further supplementary module 63 is formed in the same way as the supplementary module 57 as an overvoltage protection module. With the aid of the supplementary module 57, basic protection against overvoltages is ensured. The further supplementary module 63, on the other hand, allows sophisticated protection against overvoltages.

FIG. 14 shows a contact element 64, comprising the basic module 44 and a further supplementary module 65, which is formed as a so-called short-circuit module or bridging module and acts on the inputs 45 of the basic module 44. With the aid of the supplementary module 65, formed as a short-circuit module, a reconfiguration or conversion of the contact element 64 is possible without interruption on the subscriber side of the contact element. The supplementary module 65, formed as a short-circuit module or bridging module, accordingly has terminal contacts, which act in the inputs 45 of the basic module 44.

FIG. 15 shows the contact element 47, formed by the basic module 44 and the first supplementary module 48 and acting as a disconnection element, with a testing unit 66 pushed into the basic module 44. The testing unit 66 presses with a connector 67 between the two contact springs 42, 43 of the basic module 44. In this way, test signals can be introduced into the contact element 47 or measuring signals can be extracted from it by means of conductor tracks running along the connector 67. In the same way, a protection module can be pushed into the basic module 44 instead of the testing unit 66.

FIG. 16 shows the contact element 47 according to FIG. 7 with a disconnector 68. The disconnector 68 may be formed in the way known from the prior art. It is therefore possible, if need be, to disconnect the contact springs 42, 43 of the basic module 44 and decouple a subscriber from a telecommunications system.

FIG. 17 shows a contact element 69, comprising the basic module 44 and a further supplementary module 70, which is connected to the basic module 44 and is formed here as a so-called xDSL splitter. It is accordingly possible by selection of the widest variety of supplementary modules to adapt or reconfigure contact elements subsequently and flexibly for different intended uses as provided by the invention. The supplementary module 70, formed as an xDSL splitter, also acts via inputs 45a on the outputs 46 of the basic module 44, it being possible for further supplementary modules to be connected to outputs 46a of the supplementary module 70.

At this stage it should be pointed out that, when studying the present invention, it is self-evident to the person skilled in the art referred to here that the supplementary modules shown in FIGS. 6 to 17 can, if appropriate, also be combined to form a new supplementary module. For instance, FIG. 18 shows a contact element 71 in the case of which a supplementary module 72 is connected to the basic module 44 according to FIG. 6. The supplementary module 72 according to FIG. 18 combines the functions of the supplementary modules 57 and 58 according to FIGS. 9 and 10. The supplementary module 72 accordingly comprises a combined overvoltage protection and overcurrent protection.

FIG. 19 shows a contact element 73 which is formed by the basic module 44 and a supplementary module 74, the supplementary module 74 combining the functions of the supplementary modules 48 and 53 of FIG. 8 with one another.

The invention accordingly proposes a distribution device of a telecommunications system with contact elements of a modular structure, it being possible for the modular structure to be determined by a basic module and various supplementary modules. It is possible by the selection of the various supplementary modules to reconfigure a contact element freely for a desired intended use. In addition, functions of a cable connector and a protection magazine can be integrated into the contact element. Further functions can also be integrated into a contact element. As FIGS. 6 to 19 reveal, the basic module and the respective supplementary modules are connected in series with one another and accordingly combined with one another in series connection. Subsequent conversion of a distribution device constructed in such a way is accordingly possible readily and with little effort. It is also possible to choose whether a distribution device is prefabricated by the manufacturer for a specific application or whether the customer himself performs necessary modifications on the distribution device.

The connection of the basic module 44 to the or each supplementary module 48, 53, 57, 58, 63, 65, 70, 72 and 74 takes place via the inputs 45, 45a and outputs 46, 46a of the basic module and the supplementary module. The connection between the outputs 46 and inputs 45a and between the outputs 46a and inputs 45a preferably takes place by means of plug-in connections. Plug-in connections can be established in a simple manner by plugging in and broken in a simple manner by pulling out. This allows the or each plug-in connection to be configured using the PC connector technique, board-to-board connector technique or RS232 connector technique. The grounding terminal provided by the RS232 connector technique can be used here for shielding purposes. The selection of a suitable plug-in connection or a suitable connector is at the discretion of the person skilled in the art referred to here.

The invention claimed is:

1. A distribution device of a telecommunications system, with at least one contact element, the contact element having at least two contact springs, wherein
   a) the contact element has a modular structure in such a way that the configuration of the contact element is modifiable by modifying the modular structure,
   b) the contact element has a basic module, the basic module having the contact springs,
   c) the basic module configured such that one or more supplementary modules of different configuration than the basic module are connectable to the basic module, the combination of the basic module with the supplementary module modifying the configuration of the respective contact element.

2. The distribution device as claimed in claim 1, wherein the supplementary modules and the basic module are combinable with one another in series connection.

3. The distribution device as claimed in claim 1, wherein the configuration of the respective contact element is determined by selection of the supplementary module the number of supplementary modules or the sequence of the supplementary modules.

4. The distribution device as claimed in claim 1, wherein the basic module has inputs and outputs assigned to the contact springs.

5. The distribution device as claimed in claim 1, wherein the an supplementary modules have inputs and outputs.

6. The distribution device as claimed in claim 4, wherein, for a connection of one or more supplementary modules to the basic module, the inputs of one supplementary module engage in outputs of the basic module or in outputs of another supplementary module, these connections between the inputs and the outputs being configured using a connector technique.

* * * * *